Figure 1:
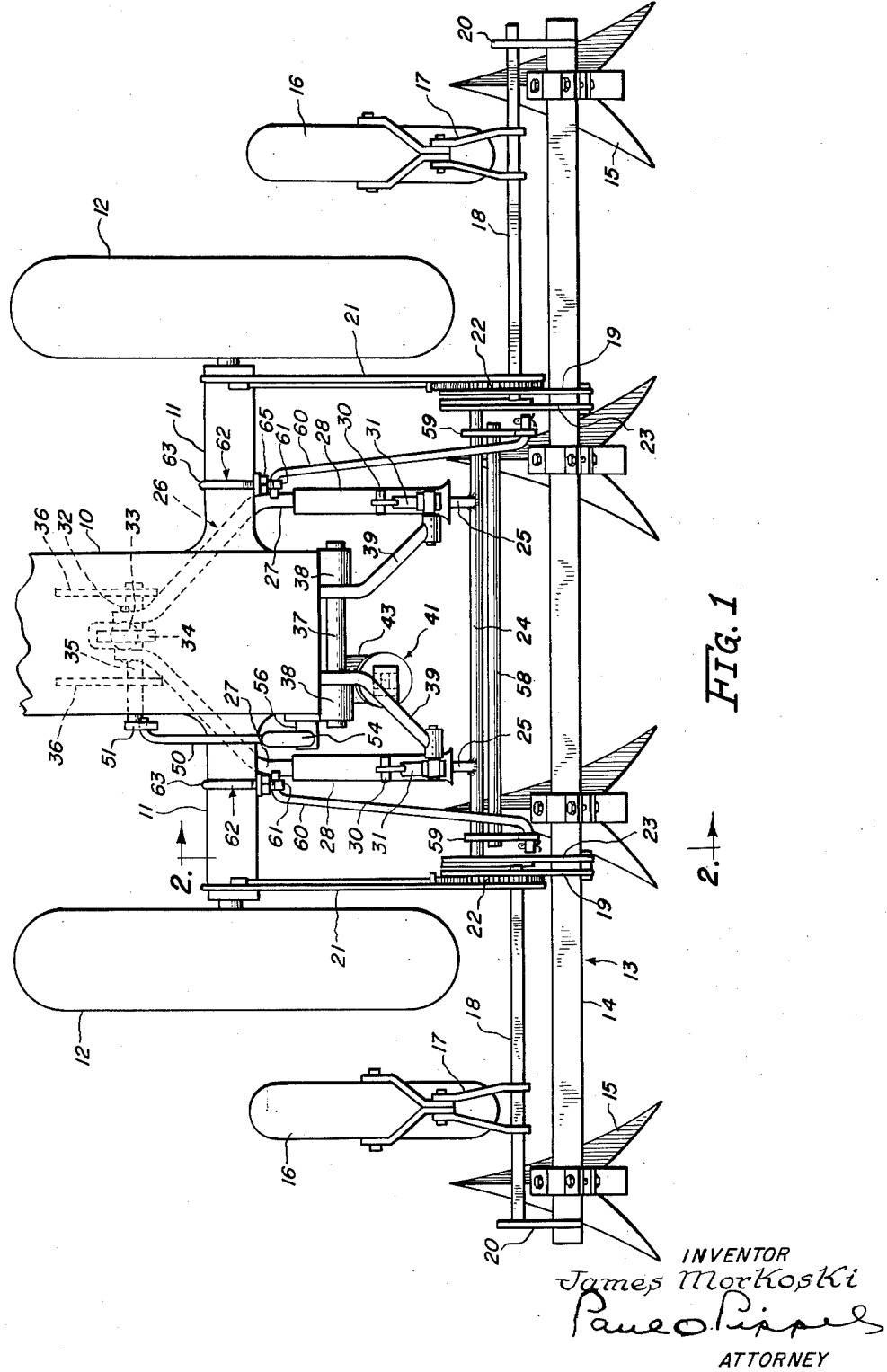

March 13, 1962  J. MORKOSKI  3,024,850
IMPLEMENT STABILIZER
Filed March 10, 1959  2 Sheets-Sheet 1

INVENTOR
James Morkoski
Paul O. Pippel
ATTORNEY

March 13, 1962 J. MORKOSKI 3,024,850
IMPLEMENT STABILIZER

Filed March 10, 1959 2 Sheets-Sheet 2

INVENTOR
James Morkoski
Paul O. Pippel
ATTORNEY

United States Patent Office 3,024,850
Patented Mar. 13, 1962

3,024,850
IMPLEMENT STABILIZER
James Morkoski, Des Plaines, Ill., assignor to International Harvester Company, Chicago, Ill., a corporation of New Jersey
Filed Mar. 10, 1959, Ser. No. 798,480
4 Claims. (Cl. 172—450)

This invention relates to agricultural implements and particularly to tractor mounted implements. More specifically the invention concerns improved stabilizing means for a tractor mounted implement.

When an implement such as a plow is suspended from the rear of a tractor and propelled thereby, it is desirable that the plow be free to follow the contour of the ground, and for this reason the connection of the implement to the tractor includes means allowing the plow to swing laterally relative to the tractor, limiting means being usually provided, however, to prevent the plow swinging into the tractor rear wheels.

On the other hand, middle busters and the like require, for optimum results, substantial lateral rigidity, and the mechanism connecting such an implement to the tractor should be substantially rigid to prevent lateral swinging of the machine relative to the tractor.

The modern trend in implement and tractor relationships is to include a more or less universal hitch structure for the tractor to which a variety of implements having different operating characteristics can be connected, adjustments being provided in the hitch to adapt it to the implement being operated. One such universal attaching structure is one of the weight transfer or traction control type, fully described in U.S. Patent 2,947,367. There, the forward end of the hitch is pivotally connected to the tractor by means which not only allow vertical and lateral swinging to accommodate implements such as plows which need to swing vertically and laterally in relation to the tractor, but means also accommodating longitudinal movement of the implement in response to draft forces acting thereon. When a middle buster or the like is connected to the hitch an adjustment is made with a view to rendering the latter rigid. For most implements, and in normal operation, such adjustments are usually adequate. However, in a widespread tool bar type of middle buster, for example, the ground forces acting on the earth penetrating tools are so great that, when combined with a normal looseness in the connections of the hitch to the tractor and of the implement to the hitch, the tool bar cannot maintain the desired relationship to the tractor. Furthermore, additional problems are created by the capacity of the hitch and implement to move rearwardly in response to draft forces, this rearward pull in the hitch structure referred to being translated into a lifting force tending to take weight from the implement and transfer it to the tractor drive wheels to improve the traction thereof and therefore the propelling power of the tractor.

The present invention contemplates means to overcome the above mentioned difficulties and has for its object the provision of novel stabilizing means for an implement of the type referred to.

Another object of the invention is to provide improved stabilizing means for an implement of the type referred to wherein the connection between the implement and tractor is adapted to apply to the implement a lifting force sufficient to balance the draft forces acting thereon, and tending to maintain the implement in a normal operating relation to the tractor.

Another object of the invention is the provision of stabilizing means for a tractor mounted implement wherein the stabilizing force necessary to balance the ground or draft forces acting on the implement increases with an increase in said draft forces.

Figure 2:
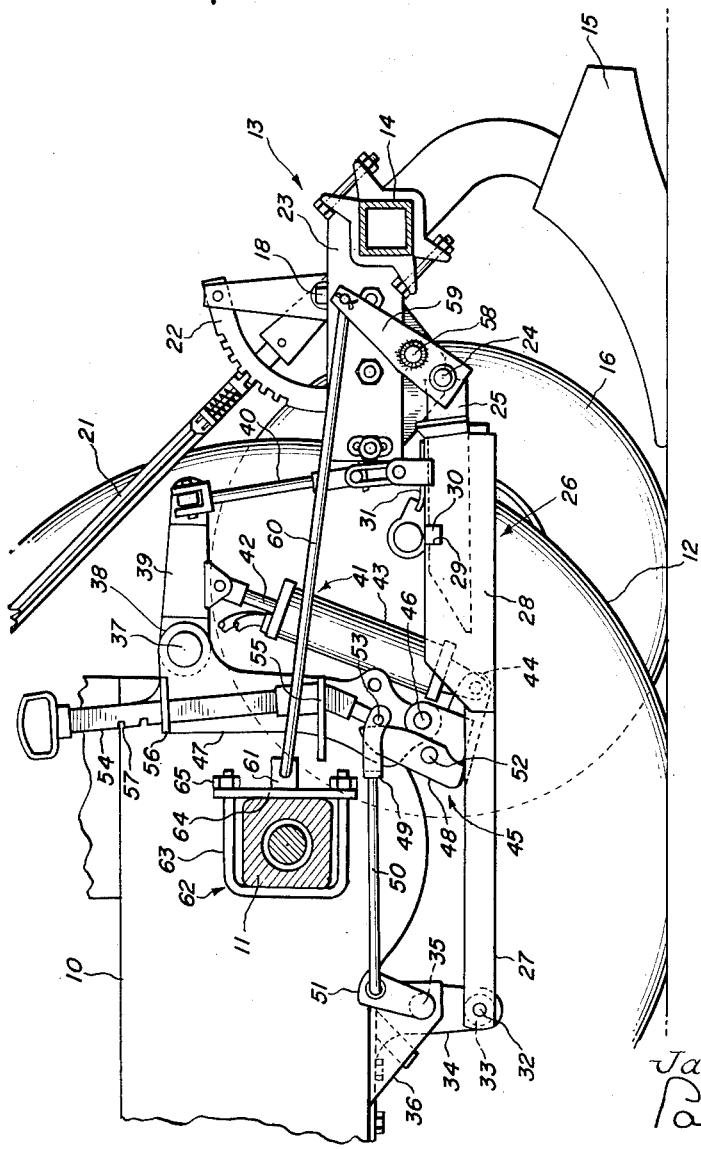

Other objects and advantages of the invention will become clear from the following detailed description when read in conjunction with the accompanying drawings, wherein:

FIGURE 1 is a plan view of the rear end of a tractor showing mounted thereon, and with parts removed for clarity, an implement attachment incorporating the features of this invention, and FIGURE 2 is a sectional view on the line 2—2 of FIGURE 1.

In the drawings the numeral 10 designates the longitudinally extending body of a tractor having laterally spaced relatively stationary rear axle housings 11 and drive wheels 12. The implement shown in the drawings is a four-row middle buster comprising a tool frame 13 which includes a transversely extending tool bar 14, square in section, upon which are mounted a plurality of laterally spaced middle buster bottoms 15. The ends of the elongated tool frame 13 are supported by a pair of ground engaging wheels 16 each of which is carried by linkage 17 from a rockshaft 18. The inner end of each of the rockshafts 18 is rotatably supported in a plate 19 affixed to tool bar 14 and the outer end of each of the shafts is supported by a plate 20, affixed to the ends of the tool bar. Each of the wheels 16 serves as a gauge wheel and it may be vertically adjusted by operation of a hand lever 21 secured to shaft 18 and associated with a quadrant 22 affixed to plate 19.

Also affixed to tool bar 14 adjacent plates 19 are laterally spaced plates 23, which project forwardly from the tool bar and have affixed thereto the ends of a transverse frame member in the form of a bar 24, to which are affixed laterally spaced forwardly extending shaft members 25.

The tool frame 13 is connected to the tractor to form an integral association therewith through the intermediary of a hitch structure comprising a draft member 26 formed of a pair of laterally spaced forwardly converging arms 27, to the lateral spaced rear ends of which are affixed longitudinally elongated socket members 28 adapted to register with and to slidably receive the shaft members 25.

Each of the sockets 28 is provided with a recess 29 adapted to receive a latch 30, shaft 25 being provided with a mating recess to receive the latch 30 and lock the shaft in the socket. Latch 30 is spring pressed to locked position by a leaf spring 31 secured to the upper surface of the socket 28.

The ends of the forwardly converging arms 27 of hitch structure 26 are parallel and are apertured to receive pins 32 projecting from opposite sides of a ball 33 adapted for universal pivoting reception in a socket formed in the lower end of an arm 34 which constitutes the hitch point of the implement on the tractor. Arm 34 is affixed to a transverse shaft 35 rotatably supported at opposite ends thereof in a bracket 36 affixed to the body of the tractor and projecting downwardly therefrom. The draft structure comprising arms 27 is connected in draft receiving relation to the tractor through hitch arm 34, and by means accommodating vertical, lateral and longitudinal movement of the hitch structure 26 by virtue of the fact that the shaft 35 is rotatably carried between the legs of the bracket 36, causing arm 34 to swing about the axis thereof in a longitudinal direction.

The hitch structure 26 and the tool frame 13 integrally associated therewith are adapted to be raised and lowered to move the implement between operating and transport positions by lifting mechanism comprising a transverse shaft 37 rockably mounted in bearings 38 on the tractor and having affixed thereto rearwardly extending laterally spaced lift arms 39 pivotally connected by links 40 with the respective socket members 28. Power is supplied to vertically swing lift arms 39 about the axis of shaft 37 by a hydraulic ram 41 comprising a piston rod 42 connected to one of the lift arms 39 and slidable in a cylinder 43, the lower end of which is anchored to an arm 44 forming a part of a composite bell crank 45 fulcrumed on a pivot pin 46 carried at the lower end of a bracket 47 affixed to one side of the tractor body. Another arm 48 of the composite bellcrank 45 has its upper ends slidably receivable in a clevis 49 at the end of a link 50, the other end of which is bent laterally and pivotally connected to an upstanding arm 51 formed at one end of shaft 35.

On actuation of the ram 41 to extend piston rod 42 the lower edge of bracket 47 is engaged by a pin forming a part of the composite bellcrank 45, rocking shaft 37 and arms 39 to raise the implement about the hitch point 32.

The implement is capable of longitudinal movement by swinging of arm 34 forwardly and rearwardly and this occurs as the result of changes in draft load on the middle buster bottoms 15. When excess draft is encountered the implement tends to move rearwardly with respect to the tractor. This rocks shaft 35 and arm 51 causing link 50 to move forwardly. A pin 53 at the rear end of clevis 49 engages the rear edge of arm 48 of the bellcrank 45 and rocks it in a counterclockwise direction, as viewed in FIGURE 2, causing thrust to be applied through ram 41 to exert a lifting effect on arms 39. This transfers some of the weight of the implement to the tractor drive wheels and improves the traction thereof. The amount of weight transferred through rocking bellcrank 45 may be adjusted by the provision of a control member 54 vertically slidable in slots provided in a pair of flanges 55 and 56 affixed to bracket 47. The lower end of member 54 is connected to pin 53 so that the latter can be vertically adjusted with respect to the rear edge of arm 48 of bellcrank 45 to vary the radial distance thereof from fulcrum 46. Notches 57 in the upper forward edge of member 54 are engageable with bracket 56 to hold the member 54 in an adjusted position.

With a hitch structure and implement of the type shown in the drawings draft forces acting on the middle buster bottoms tend to force the implement laterally and this is overcome and the implement stabilized by the provision of means accommodating the vertical swinging of the implement about the hitch point thereof on the tractor, including a transversely extending bar 58 parallel to and closely adjacent frame bar 24 and having its ends affixed, as by welding, to arms 59. Bar 58 is pivotally mounted on the tool frame for generally forward and rearward swinging by pivotally mounting the lower projecting ends of arms 59 on the bar 24.

The upper end of each of the arms 59 is connected to the laterally bent rear end of a forwardly extending rod 60, the forward end of which is bent laterally for pivotal connection to a lug 61 forming a part of a clamp 62. Clamp 62 comprises a U-shaped bolt 63 straddling one of the axle housings 11 and secured to a plate 64, to which lug 61 is affixed, engaging the rear face of axle housings 11 and secured thereto by nuts 65.

Any tendency of the implement to be swung laterally with respect to the tractor is resisted by the stabilizing means comprising the bar 58, arms 59 and rods 60. For example, if we assumed a force exerted laterally to the left against the tool frame, as viewed in FIGURE 1, right-hand arm 59 will tend to be rocked forwardly while left-hand arm 59 will tend to be rocked rearwardly, placing bar 58 under torsion and forcing the implement to maintain a normal operating position.

It is believed that the improved stabilizing means of this invention will be clearly understood from the foregoing description. It should likewise be understood that the invention has been described in its preferred embodiment only, and that modifications may be made therein without departing from the spirit of the invention or the scope of the appended claims.

What is claimed is:

1. An agricultural implement comprising a tractor, a hitch structure pivotally connected at its forward end to the tractor by means accommodating vertical and lateral swinging of the hitch structure relative to the tractor, a tool-carrying frame integrally connected to the rear end of said hitch structure for vertical swinging, and for lateral swinging therewith in response to draft forces acting on the tool frame, and additional connecting means between the tool frame and the tractor accommodating said vertical swinging while resisting the lateral swinging thereof, said additional connecting means being adapted to impose increased resistance to said lateral swinging as said draft forces increase, said additional connecting means comprising a laterally rigid assembly including a pair of alterally spaced laterally rigid lever arms pivotally mounted on the tool-carrying frame for forward and rearward swinging, a pair of substantially rigid links pivotally connected at their rear ends to said arms and at their forward ends to the tractor at laterally spaced locations, whereby the tendency of said links to swing laterally in response to draft forces tending to shift the tool frame laterally constrains one of said lever arms to rock forwardly and the other rearwardly, and a rigid bar rigidly affixed to said lever arms and adapted to be twisted by the swinging of said arms in opposite directions in response to draft forces tending to move the tool frame laterally.

2. An agricultural implement comprising a tractor having laterally spaced relatively stationary parts, a hitch structure pivotally connected at its forward end to the tractor between said stationary parts for vertical and lateral swinging relative thereto, an implement assembly including a tool frame integrally connected to the rear end of said hitch structure for vertical and lateral swinging therewith, and laterally rigid means opposing the lateral swinging of the tool frame and hitch structure, comprising, a transverse rigid torsion bar pivotally connected to the tool frame for swinging about a transverse axis, a pair of laterally rigid lever arms affixed to said bar at laterally spaced locations, and a pair of substantially rigid links pivotally connecting each of said arms to said relatively stationary parts of the tractor, whereby lateral swinging of said tool frame and hitch structure is opposed by the torque in said bar.

3. An agricultural implement comprising, a tractor having laterally spaced relatively stationary parts, a hitch structure pivotally connected at its forward end to the tractor between said stationary parts by means accommodating vertical and lateral swinging of the hitch structure relative to the tractor, a tool-carrying frame integrally connected to the rear end of said hitch structure for vertical and lateral swinging therewith, and laterally rigid means opposing the lateral swinging of the tool frame and hitch structure, comprising, a transverse rigid bar pivotally connected to the tool frame for swinging about a transverse axis, a pair of generally vertically extending laterally spaced laterally rigid lever arms rigidly affixed to said bar and pivotally mounted on the frame for forward and rearward swinging about a transverse axis and a pair of substantially rigid longitudinally extending links pivotally connecting each of said arms to said relatively stationary parts on the tractor.

4. An agricultural implement comprising a tractor, a hitch structure pivotally connected at its forward end to the tractor by means accommodating vertical and lateral swinging of the hitch structure relative to the tractor, a tool-carrying frame integrally connected to the rear end of said hitch structure for vertical swinging and for lateral swinging therewith in response to draft forces acting on the tool frame, a pair of laterally spaced lever arms pivotally mounted on the tool frame for rocking forwardly and rearwardly about a transverse axis, a pair of substantially rigid links pivotally connected to said lever arms and at laterally spaced locations to the tractor, thrust being exerted through said links upon lateral swinging of the tool frame and hitch structure to rock said arms in opposite directions and a torsion bar extending between and rigidly affixed at its ends to said lever arms to oppose the rocking of said lever arms.

References Cited in the file of this patent

UNITED STATES PATENTS

| | | |
|---|---|---|
| 2,332,720 | Hipple | Oct. 26, 1943 |
| 2,375,850 | Johnson | May 15, 1945 |
| 2,641,464 | Linn | June 9, 1953 |
| 2,653,531 | Collins | Sept. 29, 1953 |
| 2,726,097 | Darrough | Dec. 6, 1955 |
| 2,755,722 | Fraga | July 24, 1956 |
| 2,831,705 | Ellis | Apr. 22, 1958 |
| 2,874,789 | Hershman | Feb. 24, 1959 |
| 2,935,145 | Du Shane et al. | May 3, 1960 |
| 2,935,147 | Edman | May 3, 1960 |

FOREIGN PATENTS

| | | |
|---|---|---|
| 502,721 | Italy | Dec. 1, 1954 |